US012438170B2

(12) United States Patent
Ranieri et al.

(10) Patent No.: US 12,438,170 B2
(45) Date of Patent: Oct. 7, 2025

(54) ELECTRODE PRESSURE BALANCE FOR A NITROGEN BLANKETING PROCESS

(71) Applicants: CUMMINS INC., Columbus, IN (US); HYDROGENICS CORPORATION, Mississauga (CA)

(72) Inventors: Salvatore Ranieri, Etobicoke (CA); Eero Teene, Hamilton (CA); Paolo Forte, Maple (CA); Justin Rizzi, Oshawa (CA); Prabhsimran Malhi, Brampton (CA); Richard Ancimer, Toronto (CA); Sumit Tripathi, Columbus, IN (US); Sonia Sorbera, Woodbridge (CA)

(73) Assignees: CUMMINS INC., Columbus, IN (US); HYDROGENICS CORPORATION, Mississauga (CA)

( * ) Notice: Subject to any disclaimer, the term of this patent is extended or adjusted under 35 U.S.C. 154(b) by 420 days.

(21) Appl. No.: 17/957,368

(22) Filed: Sep. 30, 2022

(65) Prior Publication Data
US 2023/0290979 A1    Sep. 14, 2023

Related U.S. Application Data

(60) Provisional application No. 63/317,772, filed on Mar. 8, 2022.

(51) Int. Cl.
*H01M 8/04* (2016.01)
*H01M 8/04089* (2016.01)
*H01M 8/04111* (2016.01)
*H01M 8/04228* (2016.01)
*H01M 8/0438* (2016.01)
(Continued)

(52) U.S. Cl.
CPC .... *H01M 8/04955* (2013.01); *H01M 8/04097* (2013.01); *H01M 8/04111* (2013.01); *H01M 8/04228* (2016.02); *H01M 8/04388* (2013.01); *H01M 8/04395* (2013.01); *H01M 8/04753* (2013.01); *H01M 8/04761* (2013.01); *H01M 2250/10* (2013.01); *H01M 2250/20* (2013.01)

(58) Field of Classification Search
CPC ......... H01M 8/04955; H01M 8/04228; H01M 8/04097; H01M 8/04111; H01M 8/04388
See application file for complete search history.

(56) References Cited

U.S. PATENT DOCUMENTS 7,425,379 B2    9/2008    Joos
9,614,236 B2    4/2017    Yu et al.
(Continued)

FOREIGN PATENT DOCUMENTS

CN    113130946    7/2021
EP      3324476    5/2018

*Primary Examiner* — Olatunji A Godo
(74) *Attorney, Agent, or Firm* — Barnes & Thornburg LLP (57) ABSTRACT

The present disclosure generally relates to systems and methods for operating a shutdown process in a fuel cell system including connecting a passive electrical load to a fuel cell stack in the fuel cell system before initiating the shutdown process, disconnecting a DC-DC converter by a system controller, initiating nitrogen blanketing after a current passing through the DC-DC converter is reduced to about zero, ensuring water content in the fuel cell stack is about zero, and sending a signal to the system controller to initiate the shutdown process.

20 Claims, 5 Drawing Sheets

(51) Int. Cl.
   *H01M 8/04746*    (2016.01)
   *H01M 8/04955*    (2016.01)

(56) References Cited

U.S. PATENT DOCUMENTS

| | | | | |
|---|---|---|---|---|
| 2004/0234826 | A1* | 11/2004 | Stuhler | H01M 8/04089 |
| | | | | 429/513 |
| 2007/0154742 | A1 | 7/2007 | Tang et al. | |
| 2008/0032163 | A1 | 2/2008 | Usborne et al. | |
| 2011/0250516 | A1 | 10/2011 | Tsukada et al. | |
| 2015/0064509 | A1 | 3/2015 | Joos | |
| 2015/0125766 | A1* | 5/2015 | Forte | H01M 8/04701 |
| | | | | 429/414 |
| 2015/0288041 | A1 | 10/2015 | Forte | |
| 2016/0141684 | A1* | 5/2016 | Yamanaka | H01M 8/04753 |
| | | | | 429/444 |
| 2017/0301931 | A1* | 10/2017 | Jung | H01M 8/04302 |

\* cited by examiner

ELECTRODE PRESSURE BALANCE FOR A NITROGEN BLANKETING PROCESS

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/317,772 filed on Mar. 8, 2022, the entire disclosure of which is hereby expressly incorporated herein by reference.

TECHNICAL FIELD

The present disclosure relates to systems and methods for optimizing the shutdown process in fuel cells or fuel cell stacks.

BACKGROUND

A fuel cell stack comprises a structured set of electrodes separated by, in some embodiments, a proton exchange membrane. The proton exchange membrane facilitates the passage of hydrogen nuclei (e.g., a hydrogen atom minus an electron) between the two electrodes. Each electrode is supplied a reactant gas (e.g., hydrogen) at the anode and a reactant gas at the cathode (e.g., oxygen). A chemical reaction occurs at the membrane in which the hydrogen nuclei passing through the membrane combine with the oxygen molecules at the cathode to form water ($H_2O$). This movement of protons/hydrogen nuclei results in positive electric charge at the cathode, and a negative electric charge at the anode. The differing electric charges at the anode and the cathode permit a voltage potential that can be harnessed as electrical energy and is often used to charge batteries and/or other electronics (e.g., power motors).

During fuel cell stack shutdown, anode reactants (e.g., hydrogen or a hydrocarbon) and cathode reactant (e.g., air) are present in the fuel cell stack. The reactants can travel through the micro-pores of the membrane in the membrane electrode assembly of the fuel cell, and react or combust at the catalyst surface, releasing Gibbs free energy spontaneously in the form of heat, which causes degradation to the membrane electrode assembly (MEA) of the fuel cell. The Gibbs free energy gets split between electrical load and heat loss during the regular operation of the fuel cell system when the external electrical load is connected.

Passive electrode blanketing or nitrogen blanketing is typically used during the shutdown process. Nitrogen blanketing during the shutdown process entails using nitrogen which is an inert gas to prevent chemical reactions from occurring and degrading the fuel cell system. Nitrogen blanketing provides nitrogen ions to consume oxygen reactants at the cathode with a passive-resistive electrical load. The reactants present at the cathode are a mixture of reactive and non-reactive species. The passive-resistive electrical load consumes only the reactive species leaving the non-reactive species at the cathode.

However, there could be a significant vacuum at the anode and cathode sides during passive electrode blanketing. The vacuum, if left unbalanced could cause mechanical damage to the components of the fuel cell or fuel cell stack (e.g., MEA). Furthermore, since oxygen is a lighter molecule than nitrogen, if there is an air path available in the MEA, oxygen will diffuse towards the electrode surface at the cathode.

The oxygen may eventually propagate to the anode side through the micro-pores in the fuel cell membrane and react with the hydrogen at the electrode surface of the anode at the next startup cycle. Such a reaction may cause a local hot spot. Hence, diffusion of atmospheric oxygen from the cathode to the anode side needs to be mitigated.

The present disclosure is directed to systems and methods to manage the anode and cathode pressure of a fuel cell or fuel cell system during nitrogen blanketing using electronically actuated valves. These valves control the exit and entry of air, hydrogen supply, and exhaust of the fuel cell or fuel cell stack. The present disclosure is directed to systems and methods that take advantage of hydrogen recirculation to remove any condensate formed at the anode side of the fuel cell or fuel cell stack during nitrogen blanketing. The present disclosure is directed to systems and methods that balance the cell voltages of adjacent fuel cells in a fuel cell stack.

SUMMARY

Embodiments of the present disclosure are included to meet these and other needs.

In one aspect of the present disclosure, a method of operating a fuel cell system includes the steps of connecting a passive electrical load to a fuel cell stack comprising a membrane, an anode and a cathode, disconnecting a DC-DC converter by a system controller, initiating nitrogen blanketing after a current through the DC-DC converter is reduced to about zero, ensuring water content in the fuel cell stack is about zero, sending a signal to the system controller to initiate a shutdown process, and initiating the shutdown process in the fuel cell system. The passive electrical load is not a parasitic load.

In some embodiments, ensuring water content in the fuel cell stack is about zero may further comprise by-passing humidification of the fuel cell system by a humidification system. In some embodiments, ensuring water content in the fuel cell stack is about zero may further comprise increasing air supply to the fuel cell stack and driving the membrane in the fuel cell stack. In some embodiments, the method may further comprise shutting down an air compressor. Air may pass through the compressor before entering the cathode of the fuel cell stack.

In some embodiments, the method may further comprise recirculating fuel while operating a recirculation pump at an operating speed of about 20% to about 50% of a maximum operating speed of the recirculation pump or blower. In some embodiments, the method may further comprise determining the operating speed of the recirculation pump based on a cell voltage balance across the fuel cell stack.

In some embodiments, the method may further comprise closing an inlet air valve. The fuel cell stack may comprise the air inlet valve at a cathode inlet of the cathode and an exhaust air valve at a cathode outlet of the cathode. In some embodiments n, the method may further comprise sealing the cathode inlet, and regulating the exhaust air valve to utilize oxygen deficient air in the fuel cell stack for pressure regulation at the cathode.

In some embodiments, initiating nitrogen blanketing may comprise regulating an anode pressure by a control valve. The control valve may control hydrogen supply to the fuel cell stack. In some embodiments, the method may further comprise adjusting the anode pressure to minimize differential pressure across the membrane in the fuel cell stack. The anode pressure may be below ambient pressure. In some embodiments, the method may further comprise keeping a fuel supply valve open and adjusting the anode pressure by toggling the control valve.

In some embodiments, the method may further comprise setting the anode pressure equal to a cathode pressure, implementing a discharge resistor, and waiting for an average fuel cell voltage in the fuel cell stack to drop below about 0.026 V. In some embodiments, the method may further comprise reducing a hydrogen supply pressure to about 20 kPa more than an ambient pressure and depressuring or depressurizing a hydrogen supply line up to the control valve. In some embodiments, the method may further comprise depressurizing the hydrogen supply line up to a fuel supply valve. In some embodiments, the method may further comprise turning off the control valve after a target vacuum is present at the anode. In some embodiments, the control valve may be an electronically actuated control valve, a proportional control valve, a mechanical regulator, or an injector.

In a second aspect of the present disclosure, a fuel cell system includes a system controller and a passive electrical load. The system controller is operable to receive a signal to initiate shutdown of the fuel cell system. The passive electrical load is connected to a fuel cell stack in the fuel cell system before the system controller receives the signal to initiate shutdown. The fuel cell stack comprises a membrane, an anode, and a cathode in the fuel cell. The passive electrical load is not a parasitic load.

In some embodiments, the fuel cell system may further comprise an inlet air valve at a cathode inlet of the cathode and an exhaust air valve at a cathode outlet of the cathode. The cathode inlet may be sealed and the exhaust air valve may be controlled to regulate pressure at the cathode. In some embodiments, the fuel cell system may further comprise a physical or virtual sensing system to measure pressure in the anode or the cathode. In some embodiments, the fuel cell system may further comprise a proportional control valve. The proportional control valve may be turned off when the system controller detects an increase in anode pressure.

BRIEF DESCRIPTION OF THE DRAWINGS

These and other features, aspects, and advantages of the present disclosure will become better understood when the following detailed description is read with reference to the accompanying drawings, in which like characters represent like parts throughout the drawings, wherein.

DETAILED DESCRIPTION

The present disclosure relates to systems and methods for managing anode and cathode pressure of a fuel cell or a fuel cell stack during nitrogen blanketing. The present disclosure is directed to implementing electronically actuated valves for optimizing fuel cell system operation before and after nitrogen blanketing.

Figure 1A:
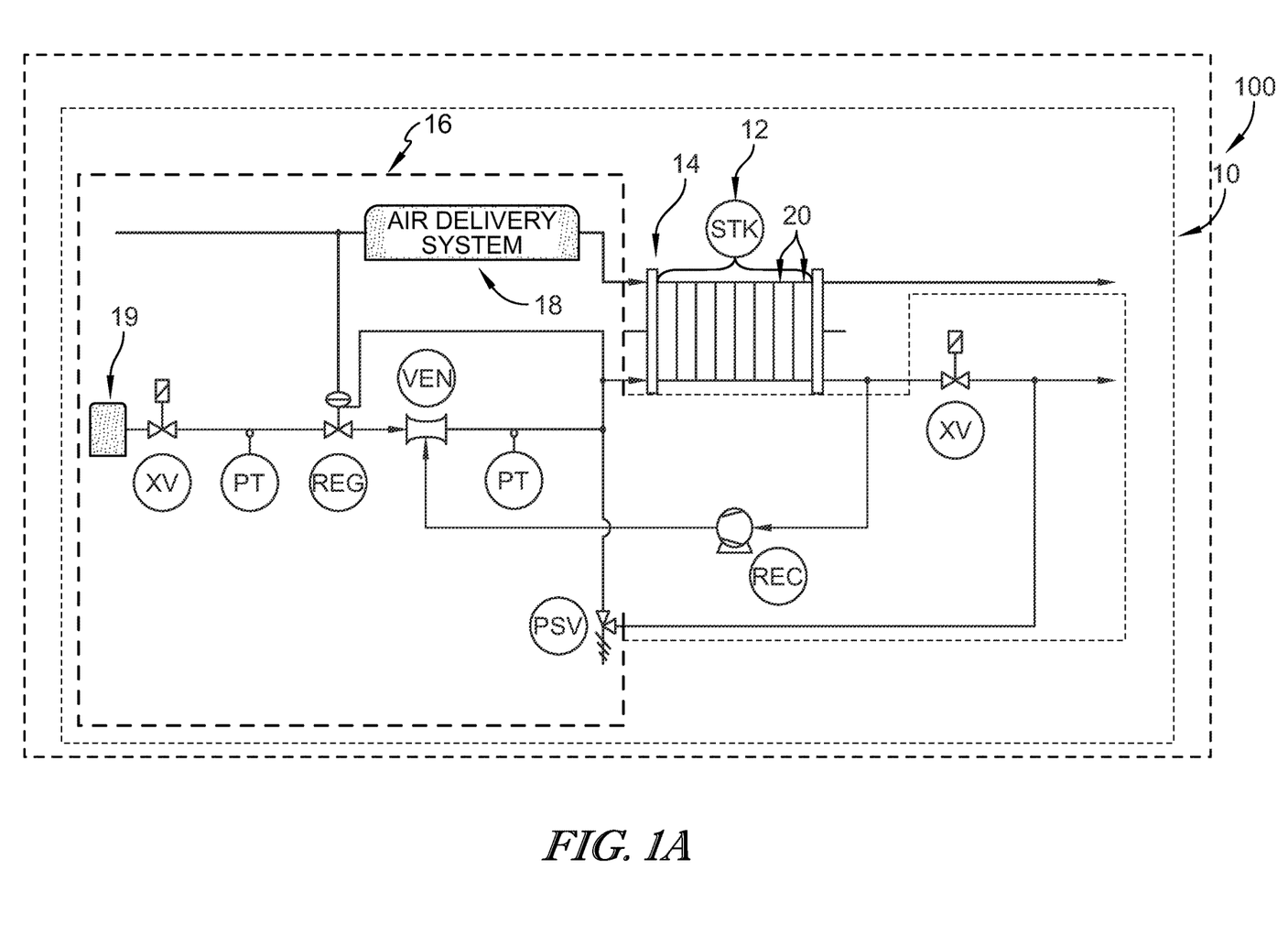
FIG. 1A is an illustration of a fuel cell system including one or more fuel cell stacks connected to a balance of plant.
Figure 1B:
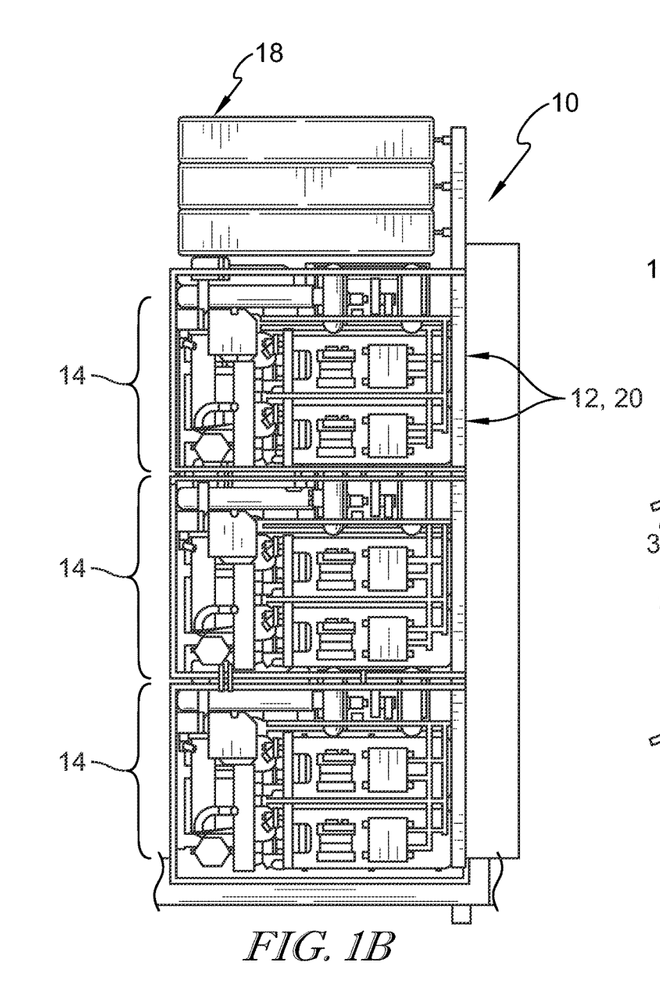
FIG. 1B is an illustration of a fuel cell system having fuel cell modules, each fuel cell module having fuel cell stacks and/or fuel cells.
Figure 1C:
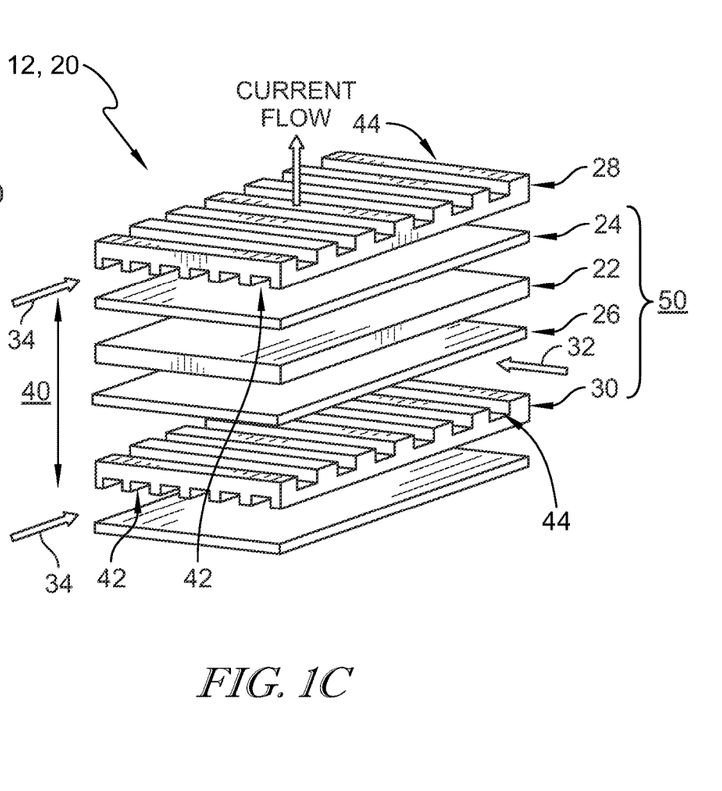
FIG. 1C is an illustration of components of a fuel cell in the fuel cell stack.

As shown in FIG. 1A, fuel cell systems 10 often include one or more fuel cell stacks 12 or fuel cell modules 14 connected to a balance of plant (BOP) 16, including various components, to support the electrochemical conversion, generation, and/or distribution of electrical power. This electrical power is used to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals, and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL)

26, the membrane electrode assembly (MEA) 22, and the gas diffusion layer (GDL) 24 comprise a single repeating unit 50.

The bipolar plates (BPP) 28, 30 are responsible for the transport of reactants such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
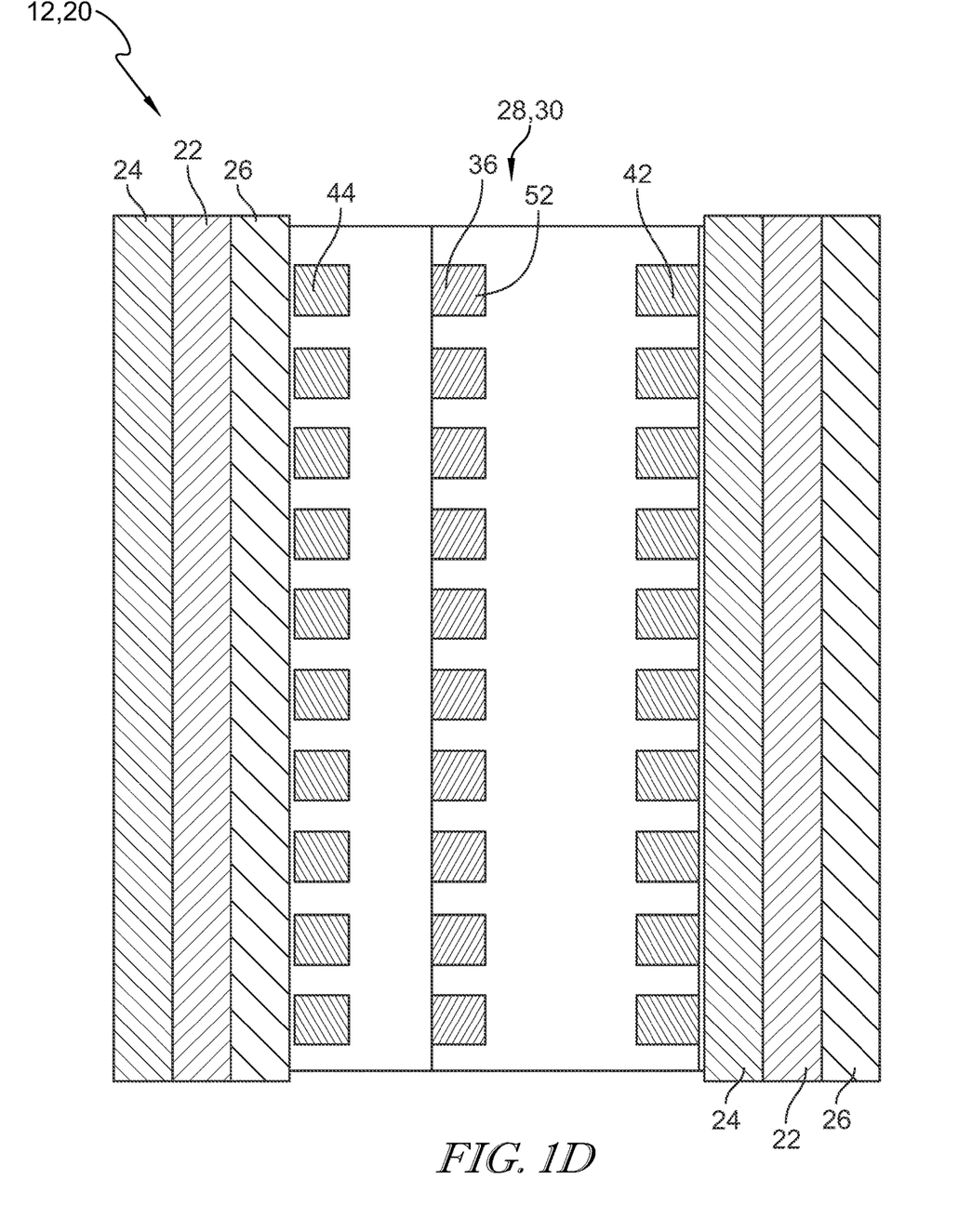
FIG. 1D is an illustration of the reactant and coolant flow fields in the fuel cell stack.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24. As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with electrolyzers 19 and/or other electrolysis system 19. In one embodiment, the fuel cell system 10 is connected and/or attached in series or parallel to an electrolysis system 19, such as one or more electrolyzers 19 in the BOP 16 (see FIG. 1A). In another embodiment, the fuel cell system 10 is not connected and/or attached in series or parallel to an electrolysis system 19, such as one or more electrolyzers 19 in the BOP 16.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

Figure 2:
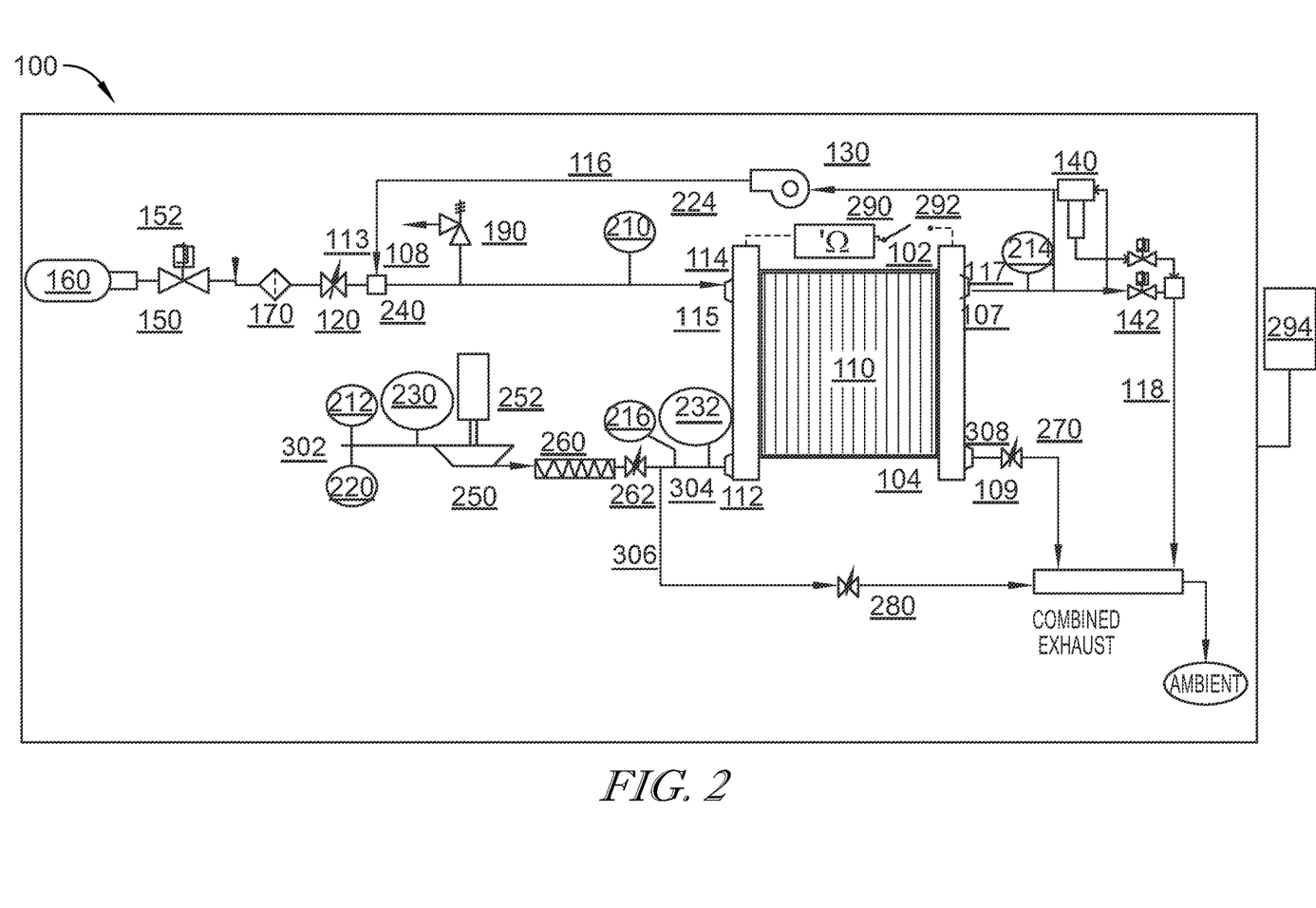
FIG. 2 is a schematic of one embodiment of a fuel cell system.

FIG. 2 illustrates an embodiment of a fuel cell system 10 comprising a fuel cell stack 12, a control valve 120, a recirculation pump, or blower 130 in series or in parallel to the fuel cell stack 12. The fuel cell system 10 further comprises a water separator 140, an anode purge valve 142, a fuel or hydrogen supply or shut off valve 150 connected to a fuel or hydrogen storage 160. The fuel cell system 10 may also include a fuel filter 170, a pressure relief valve 190, one or more pressure and temperature sensors 210, 212, 214, 216, one or more humidity sensors 220, one or more mass air flow sensors 230, 232, a venturi or ejector 240, an air compressor 250 with a motor 252, an air cooler 260, a cathode inlet valve 262, a backpressure valve 270, a by-pass valve 280, and/or a discharge resistor 290 with a switch 292.

When the hydrogen supply valve 150 is switched on, hydrogen from the hydrogen storage 160 flows through the control valve 120 and enters the ejector 240 as a regulated fuel flow stream 113. The anode inlet flow 115 exits the ejector 240 and flows through the anode 102 of the fuel cell stack 12 at the anode inlet 114. The pressure and temperature sensor 210 measures the pressure and temperature in the anode inlet flow 115 exiting the ejector 240.

Typically, the anode inlet flow 115 is a mixture of fresh fuel (e.g., $H_2$) and anode exhaust flow (e.g., $H_2$ fuel and/or water). Conversely, oxidant (e.g., air, oxygen, or humidified air) flows through the cathode inlet valve 262 into cathode 104 of the fuel cell stack 12 at the cathode inlet 112. The anode inlet flow 115 enters the fuel stack 12 where a portion of the fuel in the anode inlet flow 115 may be consumed. The unconsumed portion exits the fuel cell stack 12 at the anode outlet 107.

The venturi or ejector 240 may take advantage of the available excess exergy to draw in the secondary flow 116 working against the pressure losses through the recirculation loop or anode gas recirculation (AGR) loop 224. The secondary flow 116, also referred to as a secondary mass flow, entrainment flow, or recirculation flow, enters the ejector 240 at the secondary inlet 108 using a flow pressure across the AGR loop 224. The AGR loop 224 includes the venturi or ejector 240, the fuel cell stack 12, the recirculation pump or blower 130, the water separator 140, the anode purge valve 142, and/or other piping, valves, channels, or manifolds associated with the ejector 240 and/or fuel cell stack 12.

In one embodiment of the present fuel cell system 10, air 303 passes through the compressor 250 and the cooler 260 before entering the cathode 104 at the cathode inlet 112 as a cathode inlet air stream 304 or entering the by-pass valve 280 as by-pass air stream 306. The cathode outlet flow 308 exits the fuel cell stack 12 at the cathode outlet 109 and flows through the backpressure valve 270 before combining with the anode exhaust 118.

The control valve 120 is used to control the flow of fresh fuel also referred to as primary flow, primary mass flow, primary fuel, or motive flow to the anode 102. The control valve 120 may be a mechanical, a proportional control valve, or an injector. An exemplary embodiment of the control valve 120 is a proportional control valve 120.

The fuel cell system 10 may comprise one or more anode purge valves 142. The fuel cell system 10 may comprise one anode purge valve 142 if the fuel cell system 10 is being used for stationary applications. If the fuel cell system 10 is being used in mobile applications, such as in a vehicle based applications, the fuel cell system 10 may comprise at least two anode purge valves 142. The opening of the one or more anode purge valves 142 may be determined by which purge valve is lower than the others due to vehicle tilt/orientation. The lower purge valve 142 may be opened first. The one or more anode purge valves 142 may remove water (liquid) and/or gas through the same valves.

The fuel cell system 10 may comprise one or more fuel cell stacks 12 or one or more fuel cells 20. In other embodiments, there may also be one or multiple valves, sensors, compressors, filters, regulators, blowers, injectors, ejectors, and/or other devices in series or in parallel with the fuel cell stack 12.

The anode 102 and/or cathode 104 of the fuel cell stack 12 and other components of the fuel cell system 10 communicate with one or more controller(s) 294. Such communication may occur via a signal, such as a physical signal, a virtual signal, and/or an electronic signal. In some embodiments, the signal may be any type of communicative or computer-generated signal known in the art.

Physical and/or virtual sensing systems or methods comprising sensors may be used to decrease uncertainty in the measured entrainment ratio (ER) or excess fuel ratio. In some embodiments, the physical or virtual sensing systems or methods may comprise pressure sensors used to determine or measure the pressure in the anode 102 and/or cathode 104. Pressure balance is primarily applied to balance the pressure sensed by the anode inlet pressure sensor 210 and cathode inlet pressure sensor 216. In some embodiments, the fuel cell system 10 may include a compressor speed sensor at a shaft between the motor 250 and compressor 260. The sensors 210, 212, 214, 216, 232, 230 may be in communication with, monitored, and/or controlled by the controller 294.

The backpressure valve 270 and the by-pass valve 280 may be variable position throttle valves. In some embodiments, the backpressure valve 270 and the by-pass valve 280 may include one or more angle sensors.

An electronically actuated hydrogen flow control valve 120 in communication with the hydrogen supply or shut off valve 150 controls the pressure balance between the anode 102 and the cathode 104. The electronically actuated hydrogen flow control valve 120 also determines the mechanical robustness of the fuel cell system 10. In some embodiments, the hydrogen flow control valve 120 may be a pressure control valve. Hydrogen recirculation through the AGR 224 ensures removal of water and the maintenance of fuel cell voltage balance across the fuel cell stack 12.

A load 290 is connected to the fuel cell system 10 at the time of shutdown or startup. The load is connected to the fuel cell system 10 to ensure that the fuel cell stack 12 voltage does not exceed a certain or specific voltage limitation, for instance, an open-circuit voltage of about 0.9 V. Notably, a voltage above 0.9 V may cause catalyst degradation of the fuel cell stack 12.

The rate of wear and degradation of the fuel cell stack 12 is minimized by reducing the amount of combustion of the remaining reactants in the fuel cell stack 12. Minimization of degradation is also aided by increasing the electrochemical consumption of reactants during a shutdown process. In some embodiments, nitrogen blanketing during the shutdown process results in the depletion of oxygen and creation of an inert atmosphere around the membrane electrode assembly of the fuel cell stack 12.

If the fuel cell stack 12 is starving or operating in a mass transport limited region, the reaction rate in the fuel cell stack 12 is too high based on the fuel cell system operating conditions, such that reactants cannot reach the catalyst reaction site at the required rate. The reactants may not reach the catalyst reaction site due to diffusion or other mass transport limitations.

The Nernst equation illustrates the thermodynamically possible maximum fuel cell potential and its dependency on reactant concentration and temperature. In the equation shown below, the term RT, where R is the gas constant and T is reaction temperature, shows the dependency of the reaction on temperature. The term $$Ln\left(\frac{1}{C_{O_2}^{0.5}C_{H_2}}\right)$$

shows the dependency of the reaction on the concentration of oxygen and hydrogen.

$$E_{cell} = E_{cell}^o - \frac{RT}{nF}Ln\left(\frac{1}{C_{O_2}^{0.5}C_{H_2}}\right)$$

The concentration of the reactants in the case of a fuel cell 20 (e.g., PEM fuel cell) is determined or calculated by the partial pressure of fuel (e.g., hydrogen) and the partial pressure of oxygen. As the partial pressure of oxygen reduces, the term $$\frac{RT}{nF}Ln\left(\frac{1}{C_{O_2}^{0.5}C_{H_2}}\right)$$

increases, and eventually equals the standard fuel cell voltage ($E_{cell}^o$), resulting in the fuel cell voltage ($E_{cell}$) being zero, about zero, or substantially or significantly near zero.

The standard fuel cell voltage ($E_{cell}^o$) is about 1.23 V for the oxygen reduction reaction that occurs in the fuel cell stack 12. 1.23 V is the standard theoretically maximum possible voltage defined at 25° C. and 1 bar pressure of oxygen and hydrogen. The fuel cell voltage ($E_{cell}$) may not be more than about 0.9 V because voltages higher than about 0.9 V result in fuel cell degradation. Hence, the passive-resistive electrical resistive load 290 drives the over potential ($E_{cell}^o - E_{cell}^o$) such that the fuel cell voltage ($E_{cell}$) at a reactant partial pressure of about 1 bar is below about 0.9 V, including any specific or range of voltages comprised therein.

The passive-resistive electrical resistive load 290 may be large enough to limit or minimize ohmic losses in the fuel cell system 10. The discharge resistor 290 limits or minimizes ohmic losses by ensuring minimal current draw through it. The activation loss in the fuel cell system 10 occurs when activating the catalytic action of an Oxidation Reduction Reaction (ORR). The activation loss can reduce the actual fuel cell voltage ($E_{cell}'$) by about 0.2 V to about 0.3 V, including any specific or range of voltage comprised therein, such that the maximum voltage is no more than about 0.6 to about 0.7 V.

$$E_{cell}' = E_{cell} - \text{activation loss} \quad (2)$$

To achieve the objective of limiting losses in the fuel cell system 10 to activation loss (and removing ohmic losses), a low current density is used with an appropriate passive-resistive electrical resistive load 290. Typically, the low current density is of the order of about $$8*10^{-4} \frac{A}{Cm^2}.$$

The current density may comprise any value lower than about $$1*10^{-3} \frac{A}{Cm^2},$$

including any specific of range of voltage comprised therein.

Figure 3:
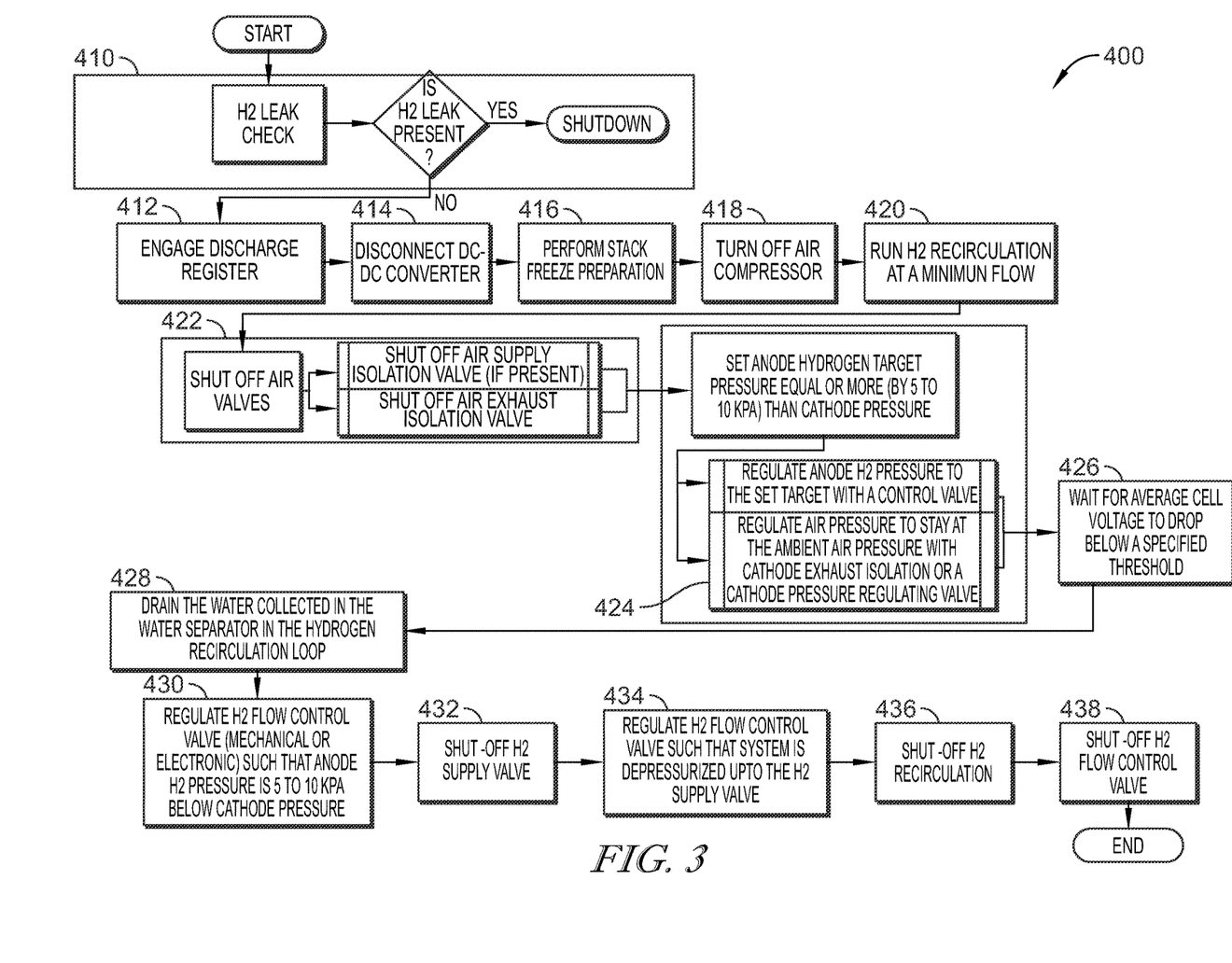
FIG. 3 is a flowchart illustrating the steps in a method of operating the fuel cell system.

As shown in FIG. 3, a method 400 of controlling or operating the fuel cell system 10 during nitrogen blanketing includes the system controller 294. The system controller 294 is necessary to monitor, analyze, and/or control the different components of the fuel cell system 10. In step 410, the method 400 includes the system controller 294 shutting down the system if any hydrogen leak is detected during the startup, shutdown, or operation of the fuel cell system 10.

If no leak is detected, in step 412, the method 400 includes the system controller 294 engaging a passive-resistive electrical resistive load 290 to an electrical outlet of the fuel cell stack 12 via the switch 292 before shutting down the fuel cell system 10. The passive-resistive electrical load 290 is not parasitic because is it disconnected when the fuel cell system 10 is operating. The load 290 is an electrical load, and could be in the form of a resistor.

The passive-resistive electrical load 290 is disconnected from fuel cell stack 12 under normal operating conditions and the DC-DC converter 292 is connected to the fuel cell stack 12. After the passive-resistive electrical load 290 is connected and a system controller 294 receives the shutdown signal, in step 414, the method 400 includes the system controller 294 disconnecting the DC-DC converter 294. The current through the DC-DC converter 294 is reduced to about zero before initiation of nitrogen blanketing.

In step 416, the method 400 includes the system controller 294 determining that minimal or no water content remains in the fuel cell stack 12 by performing a stack freeze preparation. The stack freeze preparation process is actuated to ensure residual water removal. If the fuel cell system 10 includes a humidification system, the humidification system is by-passed at step 416. The air supply into the cathode 104 is increased to ensure that the membrane in the fuel cell stack 12 dries quickly.

The air supply rate is determined experimentally. The air supply rate is typically about 50% to about 80% of the maximum possible air flow for fuel cell the system 10, including any specific or range of percentage of maximum air flow comprised therein. For example, the air supply rate may be about 60% to about 70% of the maximum possible air flow for the fuel cell system 10 or about 70% to about 80% of the maximum possible air flow for the fuel cell system 10, including any percentage or range comprised therein. The increased air supply rate may be maintained for about 10 s to about 300 s, including any specific or range of time comprised therein. The cathode 104 pressure may be set to about 5 kPa to about 30 kPa above ambient pressure, including any specific or range of pressure comprised therein, to prevent the air compressor 320 operating under choked flow conditions.

In step 418, the method 400 includes the system controller 294 turning off the air compressor 320. In step 420, the method 400 includes the system controller 294 maintaining hydrogen recirculation in the recirculation loop 224 at a minimum operating flow rate for the fuel cell system 10. The recirculation pump or blower 130 may be used to recirculate fuel as secondary flow 116 into the fuel cell stack 12. The method 400 includes operating the recirculation pump or blower 130 at about 20% to about 50% of the maximum operating speed of the recirculation pump or blower 130, including any specific or range of speed comprised therein when recirculating fuel as secondary flow 116.

The differential pressure across the anode output 107 and the secondary inlet 108 at the ejector 240 should be less than about 20 kPa, including any specific or range of pressure comprised therein. The minimum speed of the recirculation pump or blower 130 as determined by the cell voltage balance across the fuel cell stack 12 is determined experimentally. The minimum speed of the recirculation pump or blower 130 is based on the speed required to turn over the surface adsorption of the hydrogen molecules on the catalyst surface of the membrane electrode assemble (MEA) of the fuel cell stack 12.

In step 422, the method 400 includes the system controller 294 shutting of one or more air valves. Step 422 may include closing any air supply isolation valve (e.g., cathode inlet valve 262) and/or closing any air exhaust isolation valves (e.g., backpressure valve 270). The cathode inlet valve 262 and/or the backpressure valve 270 are regulated to maintain an air pressure in the cathode manifold. The pressure measured with the cathode inlet pressure sensor 216 should be equal to about the ambient pressure after any remaining oxygen in the cathode 104 is consumed.

Once the cathode inlet valve 262 is closed, the backpressure valve 270 is regulated to determine, assess, or regulate the pressure in the cathode 104. Sealing the cathode inlet 112 with the cathode inlet valve 262 and regulating the back pressure valve 270 utilizes oxygen deficient air for pressure regulation in the fuel cell stack 12. In some embodiments, during nitrogen blanketing, the pressure drop across the ejector 240 may not be effective for recirculating gases from the anode exit 107. The recirculation pump or blower 130 may be used for hydrogen recirculation in such instances.

In step 424, the method 400 includes the system controller 294 setting a target anode 102 pressure to be equal to the cathode 104 pressure or to be equal to about 5 kPa to about 10 kPa more than the cathode 104 pressure, including any specific or range of pressure comprised therein. If the target anode 102 pressure is below the ambient pressure, the anode 102 pressure is adjusted to minimize the differential pressure across the membrane in the fuel cell stack 12. The anode 102 pressure is regulated by the control valve 120 in communication with the hydrogen supply or shut off valve 150 and/or the control valve 120. The control valve 120 has a variable opening, while the hydrogen supply or shut off valve 150 is an on/off solenoid valve.

The hydrogen supply or shut off valve 150 is kept open, while the control valve 120 is controlled to keep the anode 102 pressure about equal to the cathode 104 pressure same. The difference in volume of hydrogen flowing through the hydrogen supply or shut off valve 150 and the control valve 120 is negligible. Gases, such as nitrogen, may crossover from the cathode 104 to the anode 102. Once such crossover is detected in the form of anode pressure increase by the system controller 294, the control valve 120 is turned off.

In step 426, the method 400 includes the system controller 294 ensuring, ascertaining, detecting, and/or determining that the average cell voltage in the fuel cell stack 12 has dropped below a specified threshold voltage (e.g., zero). For example, the system controller 294 may detect, calculate, and/or confirm based on measured and/or estimated values that the cell voltage, or some other system parameters, is at, above, or below a specified threshold voltage or a specified parameter value.

In some embodiments, the threshold voltage is based on the discharge resistor 290. The threshold voltage may be at or about 0.026 V. In some embodiment, the threshold voltage may range from about 0.01 V to about 0.03 V, including any voltage or range or voltage comprised therein. The threshold voltage is determined or calculated to ensure that the reaction rate at the membrane electrode assembly (MEA) of the fuel cell stack 12 allows the operating current density of the fuel cell system 10 to be less than about 0.3 mA/cm$^2$.

In step 428, the method 400 includes the system controller 294 actuating a water drain valve or the anode purge valve 142 in the anode recirculation loop 224 to drain the water collected in the water separator 140.

In step 430, the method 400 includes the system controller 294 setting a target anode 102 pressure to be equal to about 5 kPa to about 10 kPa, including any specific or range of pressure, below the measure of the cathode 104 pressure. The anode 102 pressure is regulated with an electronically actuated hydrogen flow control valve 120 in communication with the hydrogen supply or shut off valve 150 and/or the control valve 120. The hydrogen supply or shut off valve 150 may also be an electronically actuated valve. In step 432, the method 400 includes the system controller 294 shutting off the hydrogen supply or shut off valve 150.

In step 434, the method 400 includes the system controller 294 determining that the hydrogen supply pressure decreases to about ambient pressure. The hydrogen supply pressure is decreased to be between about 10 kPa and about 20 kPa, including any specific or range of pressure comprised therein, above the ambient pressure. The system controller 294 may regulate the control valve 120 and depressurize the hydrogen supply line from the hydrogen storage 160 up to the hydrogen supply or shut off valve 150. In some embodiments, depressurizing the hydrogen supply line may require an interface with the hydrogen storage 160.

In step 436, the method 400 includes the system controller 294 stopping hydrogen recirculation in the recirculation loop 224. In step 438, the method 400 includes the system controller 294 turning off the control valve 120 after reaching a target vacuum. This is determined by monitoring the pressure at the anode inlet 112 pressure with the pressure sensor 216. The target vacuum is the target anode pressure, i.e. about 5 kPa to about 10 kPa below the cathode pressure, including any specific or range of pressure comprised therein.

The one or more controllers 294 for monitoring and/or controlling the components in the fuel cell system 10 may be implemented, in some cases, in communication with hardware, firmware, software, or any combination thereof present on or outside the in the fuel cell system 10 comprising the fuel cell or fuel cell stack 12. The one or more controller 294 for monitoring and/or controlling the physical or virtual sensors used in the fuel cell system 10 may be implemented, in some cases, in communication with hardware, firmware, software, or any combination thereof present on or outside the fuel cell system 10 comprising the fuel cell or fuel cell stack 12. Information may be transferred to the one or more controllers 294 using any one or more communication technology (e.g., wired or wireless communications) and associated protocols (e.g., Ethernet, InfiniBand®, Wi-Fi®, Bluetooth®, WiMAX, 3G, 4G LTE, 5G, etc.) to effect such communication.

The one or more controller 294 may be in a computing device. The computing device may be embodied as any type of computation or computer device capable of performing the functions described herein, including, but not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and a mobile computing device.

The following described aspects of the present invention are contemplated and non-limiting:

A first aspect of the present invention relates to a method of operating a fuel cell system. The method includes the steps of connecting a passive electrical load to a fuel cell stack comprising a membrane, an anode and a cathode, disconnecting a DC-DC converter by a system controller, initiating nitrogen blanketing after a current through the DC-DC converter is reduced to about zero, ensuring water content in the fuel cell stack is about zero, sending a signal to the system controller to initiate a shutdown process, and initiating the shutdown process in the fuel cell system. The passive electrical load is not a parasitic load.

The system controller may also be responsible for ensuring, ascertaining, detecting, and/or determining that the water content of the fuel cell stack has dropped at or below a specified water content (e.g., zero). For example, the system controller may detect, calculate, and/or confirm based on measured and/or estimated values that the water content, or some other system parameters, is at, above, or below a specified threshold voltage or a specified parameter value. In some embodiments, the system controller confirms that the water content of the fuel cell stack is at or about zero.

A second aspect of the present invention relates to a fuel cell system. The fuel cell system includes a system controller and a passive electrical load. The system controller is operable to receive a signal to initiate shutdown of the fuel cell system. The passive electrical load is connected to a fuel cell stack in the fuel cell system before the system controller receives the signal to initiate shutdown. The fuel cell stack comprises a membrane, an anode, and a cathode in the fuel cell. The passive electrical load is not a parasitic load.

In the first aspect of the present invention, ensuring water content in the fuel cell stack is about zero may further comprise by-passing humidification of the fuel cell system by a humidification system. In the first aspect of the present invention, ensuring water content in the fuel cell stack is about zero may further comprise increasing air supply to the fuel cell stack and driving the membrane in the fuel cell stack. In the first aspect of the present invention, the method may further comprise shutting down an air compressor. Air may pass through the compressor before entering the cathode of the fuel cell stack.

In the first aspect of the present invention, the method may further comprise recirculating fuel while operating a recirculation pump at an operating speed of about 20% to about 50% of a maximum operating speed of the recirculation pump or blower. In the first aspect of the present invention, the method may further comprise determining the operating speed of the recirculation pump based on a cell voltage balance across the fuel cell stack.

In the first aspect of the present invention, the method may further comprise closing an inlet air valve. The fuel cell stack may comprise the air inlet valve at a cathode inlet of the cathode and an exhaust air valve at a cathode outlet of the cathode. In the first aspect of the present invention, the method may further comprise sealing the cathode inlet, and regulating the exhaust air valve to utilize oxygen deficient air in the fuel cell stack for pressure regulation at the cathode.

In the first aspect of the present invention, initiating nitrogen blanketing may comprise regulating an anode pressure by a control valve. The control valve may control hydrogen supply to the fuel cell stack. In the first aspect of the present invention, the method may further comprise adjusting the anode pressure to minimize differential pressure across the membrane in the fuel cell stack. The anode pressure may be below ambient pressure. In the first aspect of the present invention, the method may further comprise keeping a fuel supply valve open and adjusting the anode pressure by toggling the control valve.

In the first aspect of the present invention, the method may further comprise setting the anode pressure equal to a cathode pressure, implementing a discharge resistor, and waiting for an average fuel cell voltage in the fuel cell stack to drop below about 0.026 V. In the first aspect of the present invention, the method may further comprise reducing a hydrogen supply pressure to about 20 kPa more than an ambient pressure and depressuring or depressurizing a hydrogen supply line up to the control valve. In the first aspect of the present invention, the method may further comprise depressurizing the hydrogen supply line up to a fuel supply valve. In the first aspect of the present invention, the method may further comprise turning off the control valve after a target vacuum is present at the anode. In the first aspect of the present invention, the control valve may be an electronically actuated control valve, a proportional control valve, a mechanical regulator, or an injector.

In the second aspect of the present invention, the fuel cell system may further comprise an inlet air valve at a cathode inlet of the cathode and an exhaust air valve at a cathode outlet of the cathode. The cathode inlet may be sealed and the exhaust air valve may be controlled to regulate pressure at the cathode. In the second aspect of the present invention, the fuel cell system may further comprise a physical or virtual sensing system to measure pressure in the anode or the cathode. In the second aspect of the present invention, the fuel cell system may further comprise a proportional control valve. The proportional control valve may be turned off when the system controller detects an increase in anode pressure.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of operating a fuel cell system comprising:
    connecting a passive electrical load to a fuel cell stack comprising a membrane, an anode and a cathode,
    disconnecting a DC-DC converter by a system controller,
    initiating nitrogen blanketing after a current through the DC-DC converter is reduced to about zero,
    ensuring water content in the fuel cell stack is about zero,
    sending a signal to the system controller to initiate a shutdown process, and
    initiating the shutdown process in the fuel cell system,
    wherein the passive electrical load is configured to be connected during fuel cell system shutdown and disconnected during normal operation of the fuel cell system and the passive load is not a parasitic load when the fuel cell system is operating normally.

2. The method of claim 1, wherein ensuring water content in the fuel cell stack is about zero further comprises by passing humidification of the fuel cell system by a humidification system.

3. The method of claim 1, wherein ensuring water content in the fuel cell stack is about zero further comprises increasing air supply to the fuel cell stack and drying the membrane in the fuel cell stack.

4. The method of claim 1, further comprising shutting down an air compressor, wherein air passes through the compressor before entering the cathode of the fuel cell stack.

5. The method of claim 1, further comprising recirculating fuel while operating a recirculation pump at an operating speed of about 20% to about 50% of a maximum operating speed of the recirculation pump or blower.

6. The method of claim 5, further comprising determining the operating speed of the recirculation pump based on a cell voltage balance across the fuel cell stack.

7. The method of claim 1, further comprising closing an inlet air valve, wherein the fuel cell stack comprises the inlet air valve at a cathode inlet of the cathode and an exhaust air valve at a cathode outlet of the cathode.

8. The method of claim 7, further comprising sealing the cathode inlet, and regulating the exhaust air valve to utilize oxygen deficient air in the fuel cell stack for pressure regulation at the cathode.

9. The method of claim 1, wherein initiating nitrogen blanketing comprises regulating an anode pressure by a control valve, wherein the control valve controls hydrogen supply to the fuel cell stack.

10. The method of claim 9, further comprising adjusting the anode pressure to minimize differential pressure across the membrane in the fuel cell stack, wherein the anode pressure is below ambient pressure.

11. The method of claim 9, further comprising:
    setting the anode pressure equal to a cathode pressure,
    implementing a discharge resistor, and
    waiting for an average fuel cell voltage in the fuel cell stack to drop below about 0.026 V.

12. The method of claim 9, further comprising:
    keeping a fuel supply valve open, and
    adjusting the anode pressure by toggling the control valve.

13. The method of claim 11, further comprising:
    reducing a hydrogen supply pressure to about 20 kPa more than an ambient pressure, and
    depressurizing a hydrogen supply line up to the control valve.

14. The method of claim 13, further comprising depressurizing the hydrogen supply line up to a fuel supply valve.

15. The method of claim 13, further comprising turning off the control valve after a target vacuum is present at the anode.

16. The method of claim 15, wherein the control valve is an electronically actuated control valve, a proportional control valve, a mechanical regulator, or an injector.

17. A fuel cell system comprising: a fuel cell stack comprising a membrane, and anode, and a cathode, a system controller configured to receive a signal to initiate shutdown of the fuel cell system, wherein the system controller is configured to disconnect a DC-DC converter, initiate nitrogen blanketing, and ensure water content in the fuel cell stack is about zero by performing a stack freeze operation, and a passive electrical load configured to connect to the fuel cell stack before the system controller receives the signal to initiate the shutdown, wherein the passive electrical load is not a parasitic load.

18. The fuel cell system of claim 17, further comprising an inlet air valve at a cathode inlet of the cathode and an exhaust air valve at a cathode outlet of the cathode,
    wherein the cathode inlet is sealed and the exhaust air valve is controlled to regulate pressure at the cathode.

19. The fuel cell system of claim 17, further comprising a physical or virtual sensing system to measure pressure in the anode or the cathode.

20. The fuel cell system of claim 17, further comprising a proportional control valve, wherein the proportional control valve is turned off when the system controller detects an increase in anode pressure.

* * * * *